US008982895B2

(12) United States Patent
Bontu et al.

(10) Patent No.: US 8,982,895 B2
(45) Date of Patent: Mar. 17, 2015

(54) INTER-DEVICE COMMUNICATION IN WIRELESS COMMUNICATION SYSTEMS

(71) Applicants: Chandra Sekhar Bontu, Kanata (CA); Yi Song, Irving, TX (US); Zhijun Cai, Irving, TX (US)

(72) Inventors: Chandra Sekhar Bontu, Kanata (CA); Yi Song, Irving, TX (US); Zhijun Cai, Irving, TX (US)

(73) Assignee: BlackBerry Limited, Waterloo, ON (CA)

( * ) Notice: Subject to any disclaimer, the term of this patent is extended or adjusted under 35 U.S.C. 154(b) by 104 days.

(21) Appl. No.: 13/624,708

(22) Filed: Sep. 21, 2012

(65) Prior Publication Data

US 2014/0086152 A1    Mar. 27, 2014

(51) Int. Cl.
H04W 4/00 (2009.01)
H04L 1/18 (2006.01)

(52) U.S. Cl.
CPC ............. *H04W 4/005* (2013.01); *H04L 1/1816* (2013.01)
USPC .......................................................... 370/401

(58) Field of Classification Search
USPC .................................. 370/389, 392, 400, 401
See application file for complete search history.

(56) References Cited

U.S. PATENT DOCUMENTS

| 8,515,500 | B2 | 8/2013 | Das et al. | |
| 8,582,593 | B2 * | 11/2013 | Chen et al. | 370/432 |
| 8,631,466 | B2 | 1/2014 | Cha et al. | |
| 2002/0111144 | A1 | 8/2002 | Schiff | |
| 2004/0209634 | A1 | 10/2004 | Hrastar | |
| 2005/0026597 | A1 | 2/2005 | Kim et al. | |
| 2005/0111383 | A1 | 5/2005 | Grob et al. | |
| 2005/0239451 | A1 | 10/2005 | Periyalwar et al. | |
| 2006/0075263 | A1 | 4/2006 | Taylor | |
| 2006/0190470 | A1 | 8/2006 | Lemnotis | |
| 2007/0129076 | A1 | 6/2007 | Cho et al. | |
| 2008/0002658 | A1 | 1/2008 | Soliman | |
| 2008/0069063 | A1 | 3/2008 | Li et al. | |
| 2009/0075630 | A1 | 3/2009 | Mclean | |
| 2009/0119776 | A1 | 5/2009 | Palnitkar et al. | |
| 2010/0009675 | A1 | 1/2010 | Wijting et al. | |

(Continued)

FOREIGN PATENT DOCUMENTS

CN    102340829 A    2/2012
WO    00/27045    5/2000

(Continued)

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

(Continued)

*Primary Examiner* — Kerri Rose
(74) *Attorney, Agent, or Firm* — Fish & Richardson P.C.

(57) ABSTRACT

Systems, methods, and apparatuses for inter-device communication in wireless communication systems are provided. A user equipment (UE) may communicate directly with another UE over a direct inter-device communication link when they are located in proximity. The UE may simultaneously maintain an active communication link with its serving base station while communicating with other UEs over the inter-device communication link. Long term evolution (LTE) downlink or uplink radio resources may be used for communications over the inter-device communication link. Further, radio link parameters may be chosen specifically for the inter-device communication link.

31 Claims, 11 Drawing Sheets

(56) References Cited

U.S. PATENT DOCUMENTS

| | | | |
|---|---|---|---|
| 2010/0095123 A1 | 4/2010 | He | |
| 2010/0240312 A1* | 9/2010 | Peng et al. | 455/63.1 |
| 2010/0279672 A1 | 11/2010 | Koskela et al. | |
| 2011/0081908 A1 | 4/2011 | Michaelis et al. | |
| 2011/0143771 A1 | 6/2011 | Edge et al. | |
| 2011/0145421 A1 | 6/2011 | Yao et al. | |
| 2011/0147462 A1 | 6/2011 | Speich | |
| 2011/0159799 A1* | 6/2011 | Chen et al. | 455/3.01 |
| 2011/0194530 A1 | 8/2011 | Tinnakornsrisuphap et al. | |
| 2011/0258313 A1 | 10/2011 | Mallik et al. | |
| 2011/0268004 A1 | 11/2011 | Doppler et al. | |
| 2011/0275382 A1 | 11/2011 | Hakola et al. | |
| 2011/0294474 A1 | 12/2011 | Barany et al. | |
| 2011/0317569 A1 | 12/2011 | Kneckt et al. | |
| 2012/0026971 A1 | 2/2012 | Khandelia et al. | |
| 2012/0051315 A1* | 3/2012 | Wang et al. | 370/329 |
| 2012/0163235 A1 | 6/2012 | Ho et al. | |
| 2012/0163252 A1 | 6/2012 | Ahn et al. | |
| 2012/0179789 A1 | 7/2012 | Griot et al. | |
| 2013/0003629 A1 | 1/2013 | Jeong et al. | |
| 2013/0159522 A1 | 6/2013 | Hakola et al. | |
| 2013/0160101 A1 | 6/2013 | Hakola et al. | |
| 2013/0315196 A1* | 11/2013 | Lim et al. | 370/329 |
| 2013/0329689 A1* | 12/2013 | Choi et al. | 370/329 |
| 2014/0004796 A1 | 1/2014 | Cakulev et al. | |
| 2014/0010175 A1* | 1/2014 | Chiu | 370/329 |
| 2014/0122607 A1* | 5/2014 | Fodor et al. | 709/204 |
| 2014/0140296 A1 | 5/2014 | Choi et al. | |
| 2014/0153390 A1* | 6/2014 | Ishii et al. | 370/230 |

FOREIGN PATENT DOCUMENTS

| | | |
|---|---|---|
| WO | 2009/138820 | 11/2009 |
| WO | 2010/007498 | 1/2010 |
| WO | 2010/059856 | 5/2010 |
| WO | 2011/036507 | 3/2011 |
| WO | 2011/147462 | 12/2011 |
| WO | 2012052911 A1 | 4/2012 |
| WO | 2012/088470 | 6/2012 |

OTHER PUBLICATIONS

3GPP TS 36.211 V10.3.0 (Sep. 2011) Technical Specification: Evolved Universal Terrestrial Radio Access (E-UTRA); Physical Channels and Modulation (Release 10).

3GPP TS 36.212 V10.1.0 (Mar. 2011) Technical Specification: Evolved Universal Terrestrial Radio Access (E-UTRA); Multiplexing and channel coding (Release 10).

3GPP TS 36.213 V10.1.0 (Mar. 2011) Technical Specification: Evolved Universal Terrestrial Radio Access (E-UTRA); Physical layer procedures (Release 10).

3GPP TS 36.331 V10.1.0 (Mar. 2011) Technical Specification: Evolved Universal Terrestrial Radio Access (E-UTRA); Radio Resource Control (RRC); Protocol specification (Release 10).

International Search Report for Application No. PCT/US2013/026157, dated Jul. 30, 2013, 24 pages.

3GPP Standard; 3GPP TS 36.331,V11.1.0; 3rd Generation Partnership Project; Technical Specification Group Radio Access Network; Evolved Universal Terrestrial Radio Access (E-UTRA); Radio Resource Control (RRC); Protocol specification (Release 11); Sep. 2012; 325 pages.

Fodor et al., "Design Aspects of Network Assisted Device-to-Device Communications" IEEE Communications Magazine, IEEE Service Center, Piscataway, US, vol. 50, No. 3, Mar. 1 2012, pp. 170-177; 8 pages.

Intel: "Pro se Use Case for Unidirectional D2D Communication", A 3GPP Draft; S1-120065; 3GPP TSG-SA WG1, Meeting #57; Kyoto, Japan; Feb. 2012; 3 pages.

"Intel: Operator Managed and Operator Assisted D2D", 3GPP Draft; S1-120063; 3GPP TSG-SA WG1; Meeting #57, Kyoto, Japan; Feb. 2012; 4 pages.

Office Action issued in U.S. Appl. No. 13/621,703 on Nov. 19, 2014.

Office Action issued in U.S. Appl. No. 13/624,736 on Aug. 27, 2014; 14 pages.

International Search Report for Application No. PCT/US2013/026174, dated Jul. 17, 2013, 5 pages.

International Search Report for Application No. PCT/US2013/026372, dated Apr. 17, 2013, 3 pages.

International Search Report for Application No. PCT/US2013/026104, dated Jun. 24, 2013, 3 pages.

International Search Report for Application No. PCT/US2013/026356, dated Jun. 19, 2013, 3 pages.

International Search Report for Application No. PCT/US2013/026382, dated Jul. 11, 2013, 5 pages.

Search Report issued in TW Application No. 102132479 on Nov. 7, 2014, 1 page.

Office Action and Search Report issued in TW Application No. 102132483 on Dec. 25, 2014; 8 pages.

* cited by examiner

INTER-DEVICE COMMUNICATION IN WIRELESS COMMUNICATION SYSTEMS

TECHNICAL FIELD

The present disclosure generally relates to communications in wireless communication systems, and more particularly, to inter-device communications in wireless communication systems.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network, and the EPC network may forward the data packet to another base station or to the same base station that is serving another UE. Data transfer between the UEs is routed through the base station and the EPC. The communication between the UEs is controlled by the policies set by the operator administering the network.

The UEs may communicate directly with each other using other radio access technology (RAT), such as, wireless local area network (WLAN) or Bluetooth when the UEs are located in close proximity and have access to the other RAT. However, this multi-RAT communication requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various examples.

FIG. 12(*b*) illustrates another example resource assignment for an inter-device communication link

DETAILED DESCRIPTION

The present disclosure is directed to systems, methods, and apparatuses for inter-device communication in cellular wireless communication systems. In the current cellular communication system, data transfer between UEs has to be routed through a base station and a core network. When UEs located in close proximity communicate with each other, it would be advantageous for the UEs to communicate via a direct inter-device communication link between them, instead of transferring the data via a network. By providing a direct inter-device communication link between the UEs, improved overall spectral efficiency may be achieved. Moreover, the direct link between the UEs requires lower transmit power at the UE compared to transmitting to the base station, thereby resulting in battery savings at the UEs. Additionally, communicating over the direct link between the UEs may improve quality of service (QoS).

Although the UE may be able to communicate over a direct communication link using another RAT, such as, WLAN, Bluetooth, etc., it requires availability of the services of the other RAT and also requires implementation of the other RAT at the UE. Furthermore, service interruptions and dropped calls may result from switching or handover between different RATs. Therefore, it may be advantageous to enable communications over the inter-device communication link using the same cellular radio access technology and operating in the same radio band.

Reference will now be made in detail to example approaches implemented according to the disclosure; the examples are illustrated in the accompanying drawings. Wherever possible, the same reference numbers will be used throughout the drawings to refer to the same or like parts.

Figure 1:
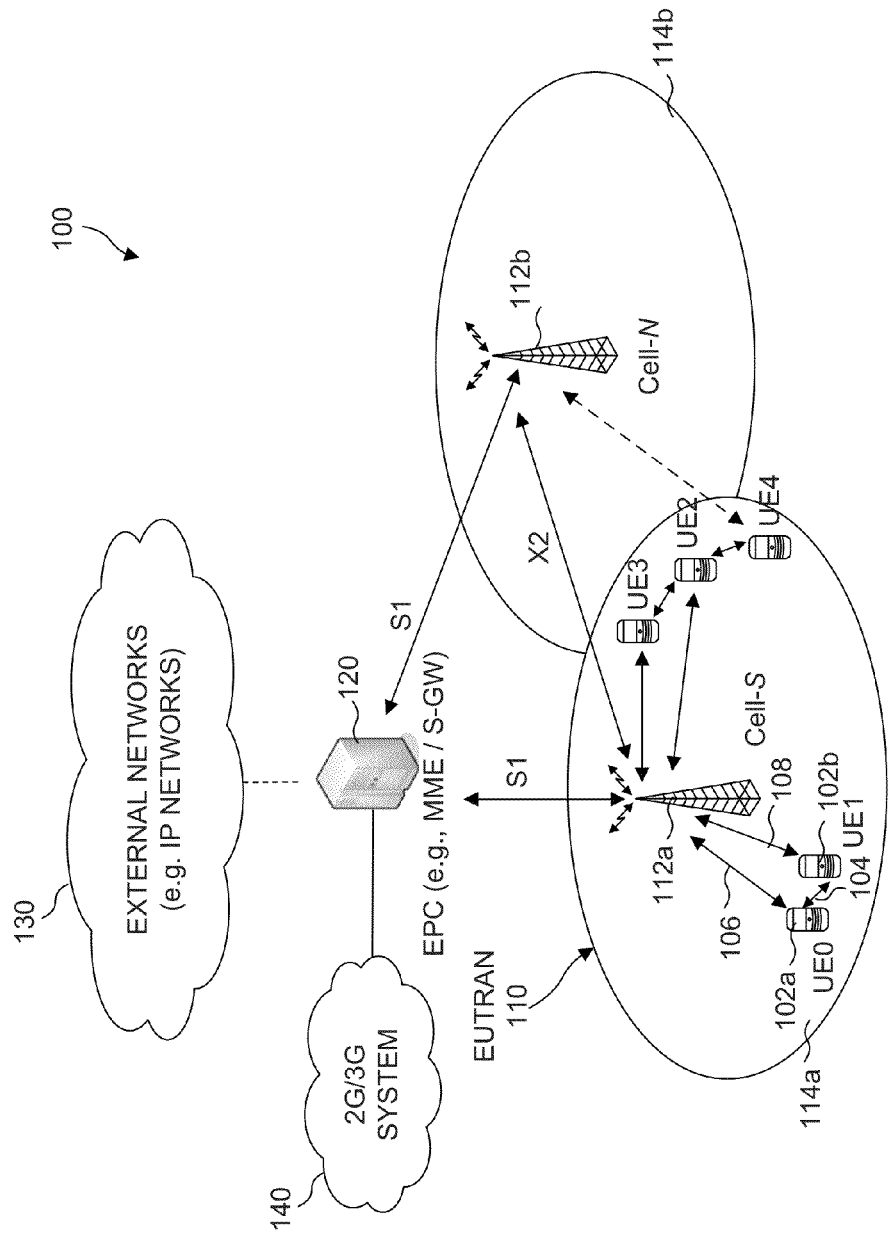
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112*a* and 112*b*). In the LTE example of FIG. 1, the base stations are shown as evolved Node Bs (eNBs) 112*a* and 112*b*, although base stations operate in any wireless communications system, including for example, macro cell, femto cell, relay cell, and pico cell. Base stations are nodes that can relay signals for mobile devices, also referred to herein as user equipment, or for other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown, one or more mobile electronic devices 102*a*, 102*b* operate within the LTE system 100. In some implementations, 2G/3G systems 140, e.g., Global System for Mobile communication (GSM), Interim Standard 95 (IS-95), Universal Mobile Telecommunications System (UMTS), and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (e.g., eNB 112a and eNB 112b) and one or more UEs (e.g., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one serving eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b such that handover may be conducted if one or both of the UEs 102a and 102b travels, e.g., from cell 114a to cell 114b. The UEs 102a and 102b may be any wireless electronic device used by an end-user to communicate, for example, within the LTE system 100.

The UEs 102a and 102b may transmit voice, video, multimedia, text, web content and/or any other user/client-specific content. The transmission of some content, e.g., video and web content, may require high channel throughput to satisfy the end-user demand. In some instances, however, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b may generate requests, send responses or otherwise communicate in different means with Evolved Packet Core (EPC) 120 and/or Internet Protocol (IP) networks 130 through one or more eNBs 112a and 112b.

In some implementations, the UEs 102a and 102b may communicate over an inter-device communication link when they are located in close proximity to one another, without routing the data through the eNB 112a. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102a and 102b may communicate directly over the inter-device communication link 104, instead of communicating with each other through their links with the eNB 112a, i.e., 106 and 108 respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB or other UEs, when communicating with each other over the direct inter-device link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (S-GW), and a packet data network gateway (PGW). The MME may be the main control element in the EPC 120 responsible for the functionalities comprising the control plane functions related to subscriber and session management. The S-GW can serve as a local mobility anchor, such that the packets are routed through this point for intra EUTRAN 110 mobility and mobility with other legacy 2G/3G systems 140. The S-GW functions may include user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
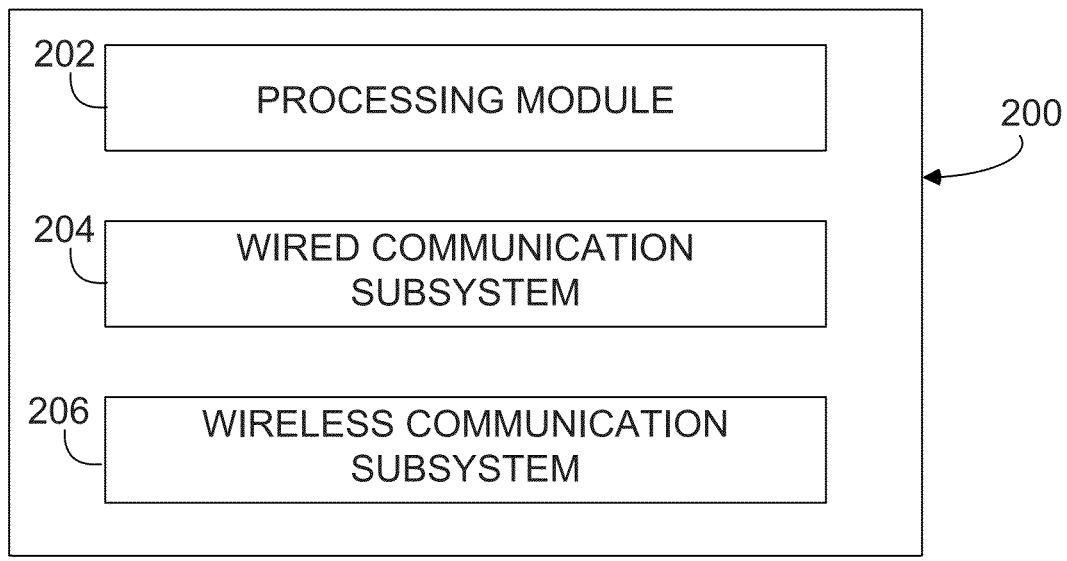
FIG. 2 illustrates an example access node device, in accordance with an example of the present disclosure.

FIG. 2 illustrates an example access node device 200 consistent with certain aspects of this disclosure. The access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory). Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200 without departing from the principles of the present disclosure.

Figure 3:
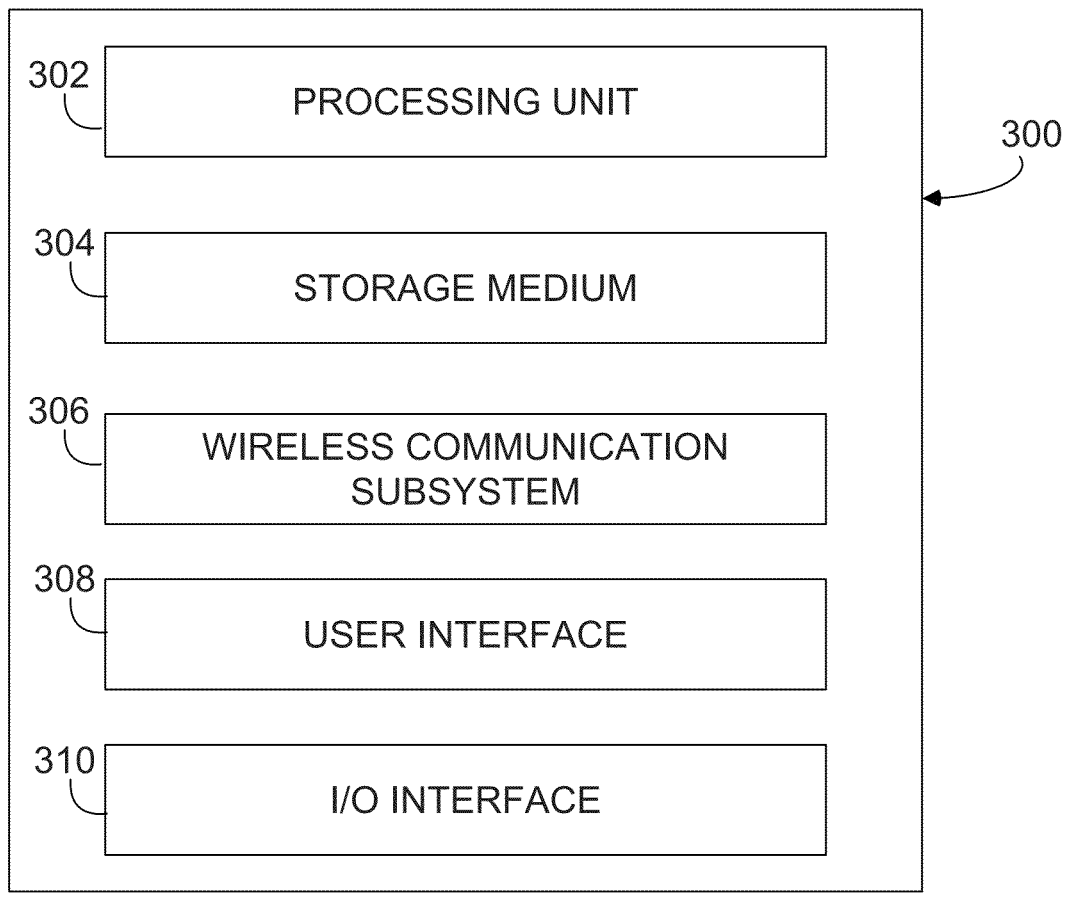
FIG. 3 illustrates an example user equipment device, in accordance with an example of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone).

The I/O interface 310 can include, for example, a universal serial bus (USB) interface. One skilled in the art will readily appreciate that various other components can also be included in the example UE device 300.

For UEs to communicate over a direct inter-device communication link, an inter-device communication link is enabled between the UEs. The direct inter-device communication link allows data exchange between the UEs, without routing through the base station and the core network.

Descriptions will now be made about methods for radio resource grant and hybrid automatic repeat request (HARQ) for the inter-device communication link in the cellular wireless communication system, according to certain examples of the present disclosure.

In general, radio resources for the direct inter-device communication link can be granted based on the availability and demand of radio resources and the geographical location of the UEs. For example, if downlink (DL) resources are abundant, the DL resources can be assigned for the data exchange over the inter-device communication link and uplink (UL) and/or downlink (DL) resources can be used for HARQ acknowledgement/non-acknowledgement (ACK/NACK) signals, channel quality indicator (CQI), scheduling request (SR), etc. Similarly, if the UL resources are abundant, UL resources can be assigned for the data exchange over the inter-device communication link, the UL and/or DL resources can be used for HARQ ACK/NACK signals and the UL or DL resources can be used for CQI, SR, etc. Furthermore, the same radio resources can be used for an inter-device link, a UE-to-eNB link and an eNB-to-UE link if these links are geographically far apart.

Figure 4:
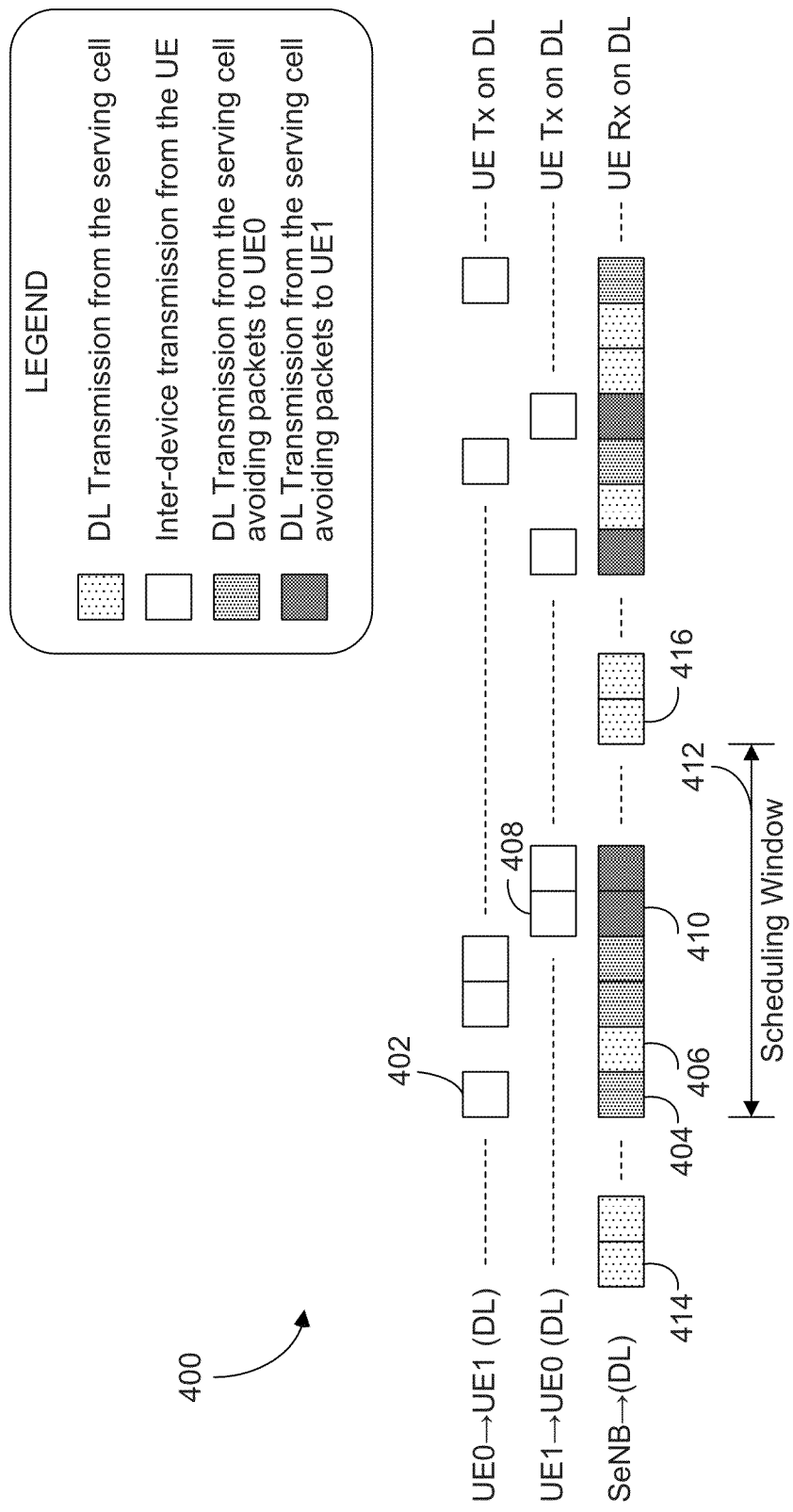
FIG. 4 illustrates an example resource allocation scheme for an inter-device communication link, in accordance with an example of the present disclosure.

FIG. 4 illustrates an example resource allocation scheme 400 when DL radio resources are used for the inter-device communication link. As shown in FIG. 4, the UEs participating in a direct communication with another device are in RRC_ACTIVE state and can actively communicate with the serving eNB. However, for a half duplex UE, the serving eNB should not send a DL message, e.g., physical downlink control channel (PDCCH) message, or a physical downlink shared channel (PDSCH) message, addressed to a UE during any subframe over which the UE is scheduled to transmit to the other UE. For example, UE0 is transmitting to UE1 over the direct link using the DL resources at 402, and thus, the serving eNB should refrain from transmitting any PDSCH, PDCCH, or physical HARQ indicator channel (PHICH) messages to UE0 in the same subframe. As shown in FIG. 4, the eNB avoids DL transmission to UE0 at 404. When UE0 is not transmitting to UE1 over the inter-device link, the eNB may transmit DL transmissions to UE0, for example, at 406. Similarly, when UE1 is transmitting to UE0 over the direct link using the DL resources at 408, the serving eNB may avoid DL transmissions to UE1 at 410. In short, the serving eNB may refrain from transmitting to a UE when the UE is transmitting to other UEs over the direct inter-device link using DL resources.

In some implementations consistent with the present disclosure, the serving eNB may assign single or multiple resource grants in one PDCCH. For example, the scheduling window 412 may include resource grants spanning one or more subframes for multiple resource grants. The serving eNB may assign the subframes to UE0 at 414 for inter-device communication using a PDCCH or a PDCCH and an associated PDSCH with medium access control (MAC) control element. Subsequently, UE0 may transmit at 402 when the scheduling window starts. After the scheduling window ends, the serving eNB may re-assign the subframes to UE0 at 416 for inter-device communication, for example, based on the scheduling request received from UE0.

When resource grants are sent using a PDCCH and a MAC control element in the associated PDSCH, the MAC control element may include the relative subframe numbers (and associated relative radio frame numbers), whether UL or DL radio resources to be used, resource block allocation, etc. The MAC control element may also include information of the subframes for reception and subframes for transmission (note that these sets are non-overlapping sets).

For a single resource grant, the PDCCH may use a downlink control information (DCI) format with an additional, or modified, field identifying the transmitting UE. For multiple resource grants, MAC control element may be used to indicate the multiple resource grants. Alternatively or in addition, in one PDCCH, the DCI information may indicate that the resource grants are for several subframes. Yet in another alternative, multiple resource grants may be indicated by new DCI formats.

These subframes could be consecutive or periodical. In the consecutive mode, the resource is valid for transmission from subframe N to subframe N+M. Where N indicates the subframe offset for the starting subframe of the scheduling window and M indicates the length of the scheduling window. As an example, N may be 4 subframes. The PDCCH grant may indicate the value of M. Either N or M or both may be signaled by the high layer signaling such as the radio resource control (RRC) signaling, MAC control element, or pre-configured by the network, or pre-set by the standards. In the periodical mode, the resources may be valid starting from N, and then valid every M subframes. The maximum number of subframes for the resource grants may be signaled as well. In some implementations, all or some of these parameters may be signaled by the PDCCH grant. Alternatively or in addition, all or some of these parameters may be signaled by the high layer signaling such as the RRC signaling or MAC control element.

Figure 5:
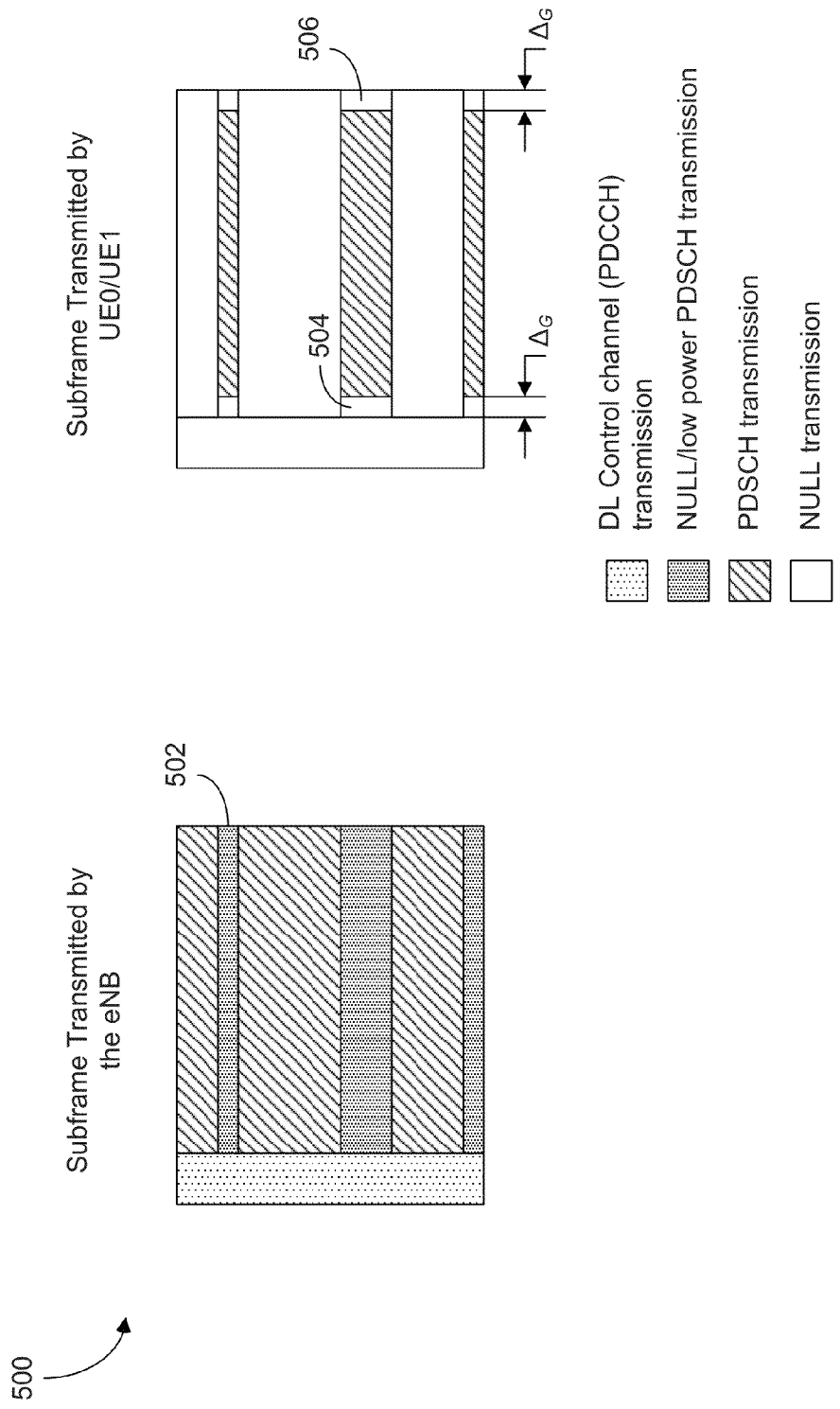
FIG. 5 illustrates an example resource partitioning scheme for an inter-device communication link, in accordance with an example of the present disclosure.

FIG. 5 illustrates an example resource partitioning scheme 500 for a subframe of an inter-device communication link when DL radio resources are used for the inter-device communication link. As shown in FIG. 5, the transmissions from the UEs are restricted to the PDSCH region of the subframe. The UE is not transmitting to other UEs over the inter-device communication link in the PDCCH region of the subframe to avoid generating interference to the PDCCH transmission from the eNB. The UE transmitting over the inter-device link should adjust its transmit timing such that the packets transmitted from the serving eNB and the UE are received in synchronization at the receiving UE. The resource blocks used for the inter-device communication may be reused by the eNB based on geographical location of other UEs, e.g., at 502. In other words, the eNB may assign the radio resources 502 to another UE and may transmit data packets during 502 to another UE. One reason for possible resource reuse between the D2D link and the eNB-UE link is that the UE typically transmits at low power for the inter-device communication over the direct inter-device communication link, and thus the inter-device communication may not cause great interference to communications over the eNB-UE link. By reusing the frequency resources by the eNB, higher spectral efficiency can be achieved.

As shown in FIG. 5, an additional guard time $\Delta_G$ may be adopted on either side of the resource blocks. The guard time may be useful to account for transmit timing offset between the D2D link and the network-device link. The guard time $\Delta_G$ may be configured in terms of number of orthogonal frequency divisional multiplexing (OFDM) symbols. Further, the guard time $\Delta_G$ may be placed after the control region such as 504, or before the last OFDM symbols, such as 506, within a subframe. The guard time can be enabled on both sides of the assigned RBs or one of the sides. In some implementations, the guard time may be configured by the serving eNB.

Figure 6:
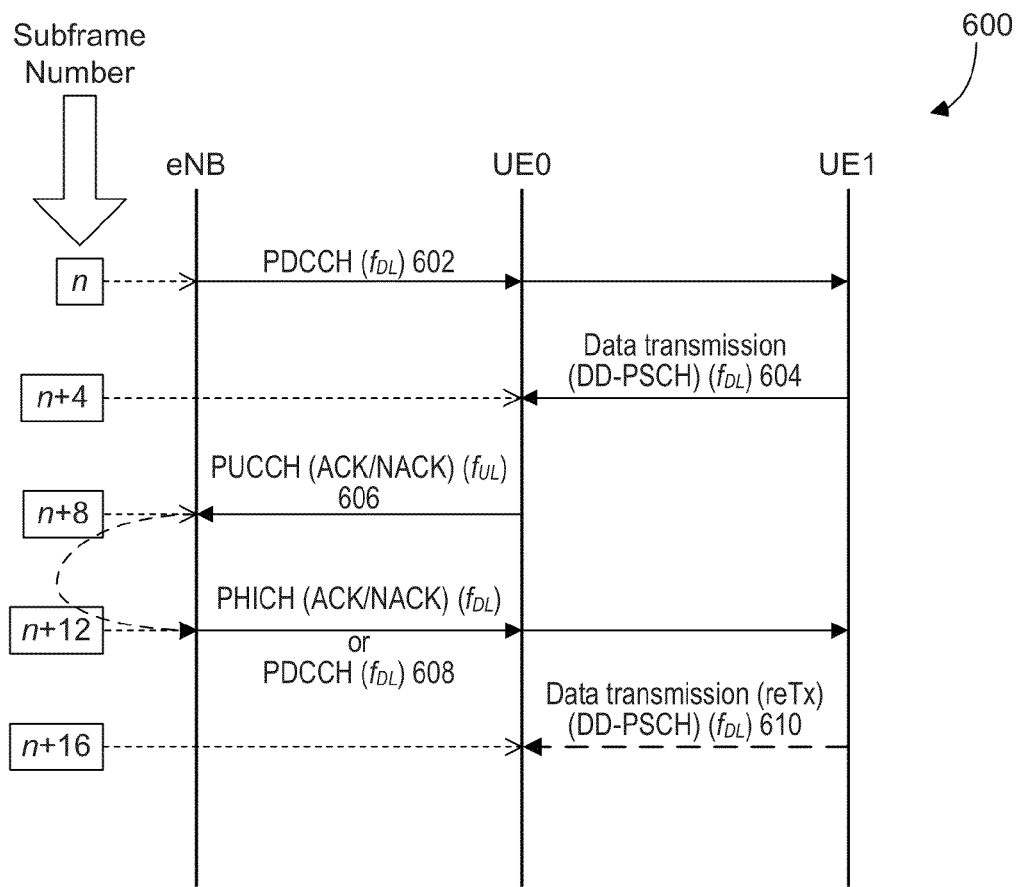
FIG. 6 illustrates a flow diagram of an example hybrid automatic repeat request (HARQ) transmission scheme for an inter-device communication link, in accordance with an example of the present disclosure.

FIG. 6 illustrates a flow diagram 600 of an example hybrid automatic repeat request (HARQ) transmission scheme for an inter-device communication link when DL frequency ($f_{DL}$) is used for the inter-device communication link, in accordance with an example of the present disclosure. In this example, the D2D link layer 1 control signals (e.g., ACK/NACK, CQI, rank indicator, etc.) are routed through the eNB. A UE may receive a data packet from another UE over an inter-device communication link and transmit a HARQ signal to a base station, the HARQ signal indicating whether the data packet received over the inter-device communication link is successfully decoded. Similarly, A UE may transmit a data packet to another UE over an inter-device communication link, and receive a HARQ signal from a base station, the HARQ signal indicating whether the data packet transmitted over the inter-device communication link is successfully decoded at the other UE. The base station may receive a HARQ signal from a UE, the HARQ signal indicating whether a data packet received over an inter-device communication link is successfully decoded. In some implementations, the UE may transmit a data packet to one other UE over an inter-device communication link and receive a physical downlink control (PDCCH) signal from a base station, the PDCCH signal indicating whether a transmission over the inter-device communication link is for a new transmission or a retransmission.

As shown in FIG. 6, the eNB sends out the resource grant for D2D communication on PDCCH at 602. The PDCCH for D2D communication may be scrambled by a device-to-device radio network temporary identity (DD-RNTI) for identifying the direct inter-device link. Both of the D2D UEs, i.e., UE0 and UE1, monitor the PDCCH from eNB for the resource grant. This resource grant may indicate the transmit point ID (TPID) as part of the DCI format. The UE with the TPID may transmit the data packets and the other UEs may listen to the transmission during those granted radio resources.

After receiving the PDCCH, the D2D transmitting UE, i.e., UE1, performs the D2D transmission using the resources, and modulation and coding scheme (MCS) indicated in PDCCH at 604. The D2D transmission may occur after a pre-determined time period from the time the resource grant is received. For example, the D2D transmission 604 over the Device-to-Device Packet Shared Channel (DD-PSCH) may occur at four subframes later than the time the transmission of resource grant 602. The D2D transmission over DD-PSCH may be scrambled by DD-RNTI. Similarly, the D2D receiving UE, i.e., UE0, expects to decode the D2D data on the resources indicated in PDCCH 4 subframes later. The predetermined time period may be other than 4 subframes. For example, this period can be less than 4 subframes as long as it is longer than the time required for the UE to decode the PDCCH.

Once the D2D receiving UE, i.e., UE0, decodes the D2D data, the D2D receiving UE will send a HARQ signal, e.g., ACK/NACK to the eNB via physical uplink control channel (PUCCH) at 606. The ACK/NACK signal is transmitted to the eNB using UL frequency ($f_{UL}$). This ACK/NACK transmission may occur after a pre-determined time period from the time the D2D receiving UE decodes the D2D data. For example, the ACK/NACK transmission 606 may occur at four subframes later than the time the D2D receiving UE decodes the D2D data. The pre-determined time period may be other than 4 subframes. For example, this period can be less than 4 subframes as long as it is longer than the time required for the UE to decode the D2D data. The resource and transmission parameters for PUCCH to indicate the ACK/NACK of the packet transmitted from UE1 to UE0 is configured by the serving eNB a priori. This configuration information may be sent to the respective UEs, for example in a RRC message. The same or different PUCCH configuration may be used for ACK/NACK feedback for data transmissions from UE1 to UE0 and UE0 to UE1. Alternatively, there can be an implicit relation between the D2D radio resources and the PUCCH configuration. For example, when an eNB assigns certain resource over D2D link for UE1 for transmission to UE0, the resource index used for ACK/NACK signal transmitted from UE0 to eNB is derived from the resource index allocated for UE1 for transmission.

After the eNB receives ACK/NACK, the serving eNB may send out a PDCCH for either a new transmission or a retransmission for the adaptive retransmissions. Alternatively or in addition, the serving eNB can send the ACK/NACK over PHICH for the non-adaptive retransmissions. The resource and transmission configuration for PHICH may be allocated by the serving eNB, or alternatively, there can be an implicit relation between the D2D radio resources and the PHICH and/or PUCCH configuration. Both the UEs taking part in D2D communication, i.e., UE0 and UE1, can listen to the eNB for the ACK/NACK. In this way, the transmitting UE can check whether the eNB received ACK/NACK correctly. After receiving the ACK/NACK signal or the PDCCH signal from the eNB at 608, UE1 may retransmit the data packet to UE0 at 610 using the allocated inter-device link resources, if a NACK is received or if a PDCCH retransmission message is received.

In some implementations, after the D2D transmitting UE transmits the D2D data, the UE may maintain the data in its HARQ buffer. When the UE receives the PDCCH for new transmission (e.g., NDI bit is set or toggled) for this HARQ process, the UE may flush the HARQ buffer and store the new data received from the RLC layer. When the UE receives the PDCCH for the retransmissions, the UE may retransmit the data in the HARQ buffer according to the MCS and the redundancy version (RV). By this way, eNB may not need to indicate the ACK/NACK signal to the respective UEs.

The D2D HARQ process can be implemented in a synchronous mode or an asynchronous mode. In the synchronous mode, HARQ process may be identified by the subframe number, which may be similar to the LTE UL operation. For example, in the LTE UL operation, the HARQ process of a PHICH is linked to the UL data packet that is transmitted a number of subframes (e.g., 4 subframes) earlier. In this mode, no HARQ process number is needed in the PDCCH resource grant. In the asynchronous mode, the HARQ process number may be indicated in the PDCCH resource grant. The UE may operate the HARQ process according to the HARQ ID in the PDCCH resource grant. In doing so, no PHICH is needed for the D2D communication, which may improve the D2D communication reliability. The probability of successful reception of ACK/NACK at UE1 may be optimized based on the reception quality of PUCCH at the eNB and PHICH at the UE1, e.g., $p_e = 1-(1-p_{PUCCH})(1-p_{PHICH})$, when the serving eNB sends the received ACK/NACK from UE0 to UE1 through PHICH. The probability of successful reception of ACK/NACK at UE1 may be optimized based on the reception quality of PUCCH at the eNB and PHICH at the UE1, e.g., $p_e = 1-(1-p_{PUCCH})(1-1p_{PDCCH})$ when the serving eNB sends PDCCH with NDI bit set according to the received ACK/NACK from UE0.

To distinguish the ACK/NACK signals from/to the serving eNB and to the other UEs, each D2D UE may be assigned two sets of PUCCH and PHICH resources. In some implementations, the same set of resources can be used if the resource scheduling is performed such that there is no conflict between the network-to-device and device-to-device communication channels.

It should be noted that the HARQ round trip time (RTT) for the D2D link may increase compared to the current LTE system. Further, in subframe n, the D2D transmitting UE may need to listen to the eNB for PDCCH during the first few OFDM symbols and then switch to transmission mode during the remaining OFDM symbols. Therefore, a guard period may be needed. When the PDSCH transmissions from the eNB and from the UE occur on different carriers, this guard period may be avoided. Likewise, in subframe n, the D2D receiving UE may need to listen to the eNB for PDCCH during the first few OFDM symbols and then listen to the D2D transmitting UE during the remaining OFDM symbols. Therefore, the D2D receiving UE may need to know the starting point of the D2D link PDSCH region. This start point could be pre-configured or signaled by the serving eNB during the D2D link setup stage, e.g., during the device handshake/discovery procedures. In subframe n+8, the ACK/NACK is transmitted on the UL frequency. Therefore, the UEs may perform D2D transmissions and the ACK/NACK transmission simultaneously, for the reason that D2D communications use the DL frequency.

The D2D UE may transmit D2D link CQI feedback to the eNB on PUCCH. The D2D link quality is expected to be stable, and hence the frequency of CQI feedback can be low. As an example, the D2D transmission may use transmission mode (TM) 9 with demodulation reference signal (DMRS). The CQI may be estimated based on DMRS. Further, to assist the eNB determining when to allocate the resources for D2D communication, the D2D UE could send Buffer Status Report (BSR) or SR to the eNB.

Figure 7:
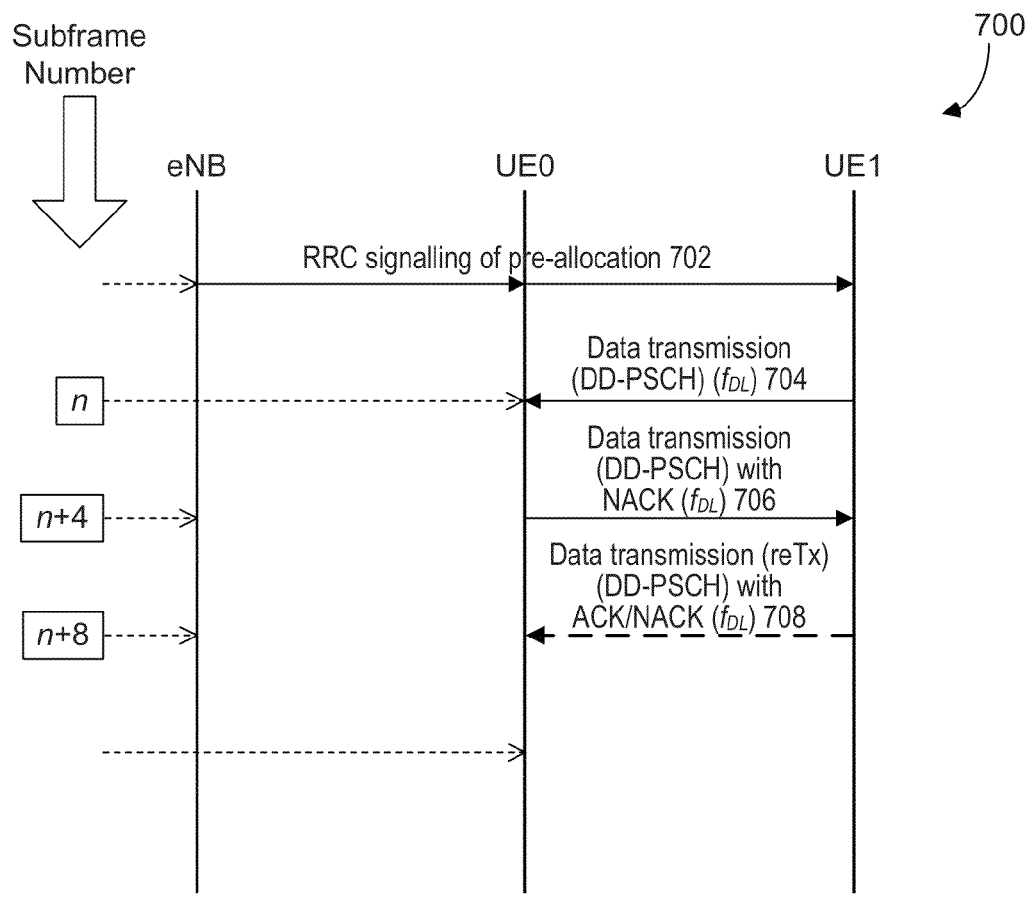
FIG. 7 illustrates a flow diagram of another example HARQ transmission scheme for an inter-device communication link, in accordance with an example of the present disclosure.

FIG. 7 illustrates a flow diagram 700 of another example HARQ transmission scheme for an inter-device communication link when DL resources are used for the inter-device communication, in accordance with another example of the present disclosure. In this approach, the D2D resources are pre-allocated by the eNB, and the HARQ signals (e.g., ACK/NACK) are transmitted directly on the inter-device communication link without routing through the eNB. A UE may receive a data packet from another UE over an inter-device communication link and transmit a HARQ signal over the inter-device communication link to the other UE, the HARQ signal indicating whether the data packet received over the inter-device communication link is successfully decoded. Similarly, a UE may transmit a data packet to another UE over an inter-device communication link and receive HARQ signal over the inter-device communication link from the other UE, the HARQ signal indicating whether the data packet transmitted over the inter-device communication link is successfully decoded at the other UE.

The eNB may signal the two D2D UEs about the allocated resource for the D2D communication at 702, including for example, the assigned resource blocks and the subframes, the MCS, the transmission mode, the transmit power, etc. The pre-allocation parameters may be signaled via RRC. Alternatively the pre-allocation may be signaled via a MAC control element.

During the D2D communication, the D2D receiving UE may try to decode the signal from the D2D transmitting UE at 704 with the information provided in the pre-allocation. The ACK/NACK signal for the received D2D transmission may be piggybacked to the data transmission at 706. Non-adaptive HARQ may be used. The UE may trigger a packet retransmission at 708 if NACK signal is received. The HARQ process number of the D2D communication may be linked to the subframe number such that the UE can identify the HARQ process number without additional signaling.

During the D2D communication, the D2D UEs may periodically update the eNB about the D2D link quality such that the eNB can adjust the resource allocation for the D2D link.

The D2D UEs may send the D2D link quality update to the eNB on PUCCH, via the high layer signaling, piggybacked to the data, or via the MAC control element. As an example, the D2D transmission may use transmission mode (TM) 9 with DMRS. The D2D link channel quality may be estimated based on the DMRS.

During the D2D communication, the D2D UE may not need to monitor the eNB for most of the time. To enable the eNB to modify the resource allocation during the D2D communication period and to enable the D2D UE to receive the incoming calls from the eNB during the D2D communication period, the D2D UE may be configured to tune away from D2D periodically and listen to the eNB. This may be configured jointly with the discontinuous reception (DRX) functionality. For example, the eNB may configure the D2D UE in the DRX mode. During the DRX on duration, the UE may need to monitor the PDCCH from the eNB. During the DRX off duration, the D2D device could enter the D2D communications without monitoring any PDCCH from the eNB.

To assist the eNB in determining when to start or stop the resource allocation for D2D communication, the D2D UE may send a BSR or SR to the eNB. In some implementations, if the D2D link has been idle for a certain time period, the UE may signal the eNB to withdraw the pre-allocated resource.

The above methods described in connection with FIGS. 4-7 are provided for the scenarios where downlink resources are used for the D2D link communication. Resource allocation schemes and HARQ transmission schemes for the scenarios where uplink resources are used for the D2D link communication will be provided next.

Figure 8:
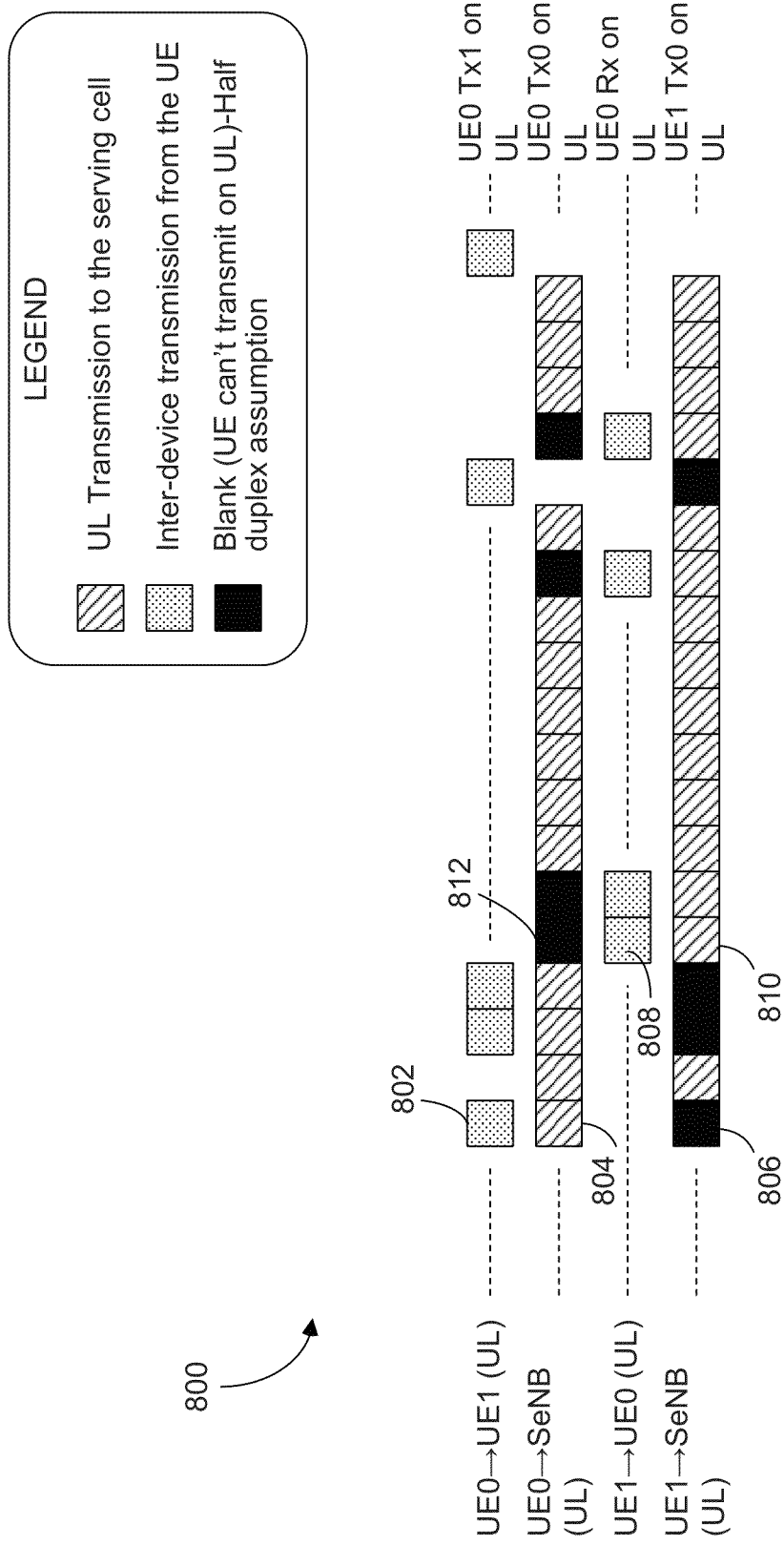
FIG. 8 illustrates another example resource allocation scheme for an inter-device communication link, in accordance with an example of the present disclosure.

FIG. 8 illustrates an example resource allocation scheme 800 for an inter-device communication link when UL radio resources are used for the inter-device communication link. In this example resource allocation scheme, the UE is able to transmit to other UEs using UL resources and transmit to the serving eNB using UL resources simultaneously. As shown in FIG. 8, UE0 transmits to UE1 using UL resources (802) and transmits to the serving eNB (804) in the same subframe. This may be possible when UE0 has two separate transmit chains for D2D link and network-device link. Because the UE operates in a half-duplex mode, UE1 is not able to transmit to the serving eNB while listening to the transmission from UE0 over the inter-device link on UL resources. Therefore, 806 is shown as a blank subframe for UE1. In other words, the serving eNB should avoid scheduling uplink transmission for UE1 while UE1 is listening to transmissions from other UEs over the inter-device link, e.g., at 806.

Similarly, UE1 may transmit to UE0 using UL resources at 808 and transmit to the serving eNB using UL resources at 810 simultaneously. Because the UE operates in a half-duplex mode, UE0 is not able to transmit to the serving eNB while listening to the transmission from UE1 over the inter-device link on UL resources. Therefore, 812 is shown as a blank subframe for UE0. In other words, the serving eNB should avoid scheduling uplink transmission for UE0 while UE0 is listening to transmissions from other UEs over the inter-device link, e.g., at 812.

Figure 9:
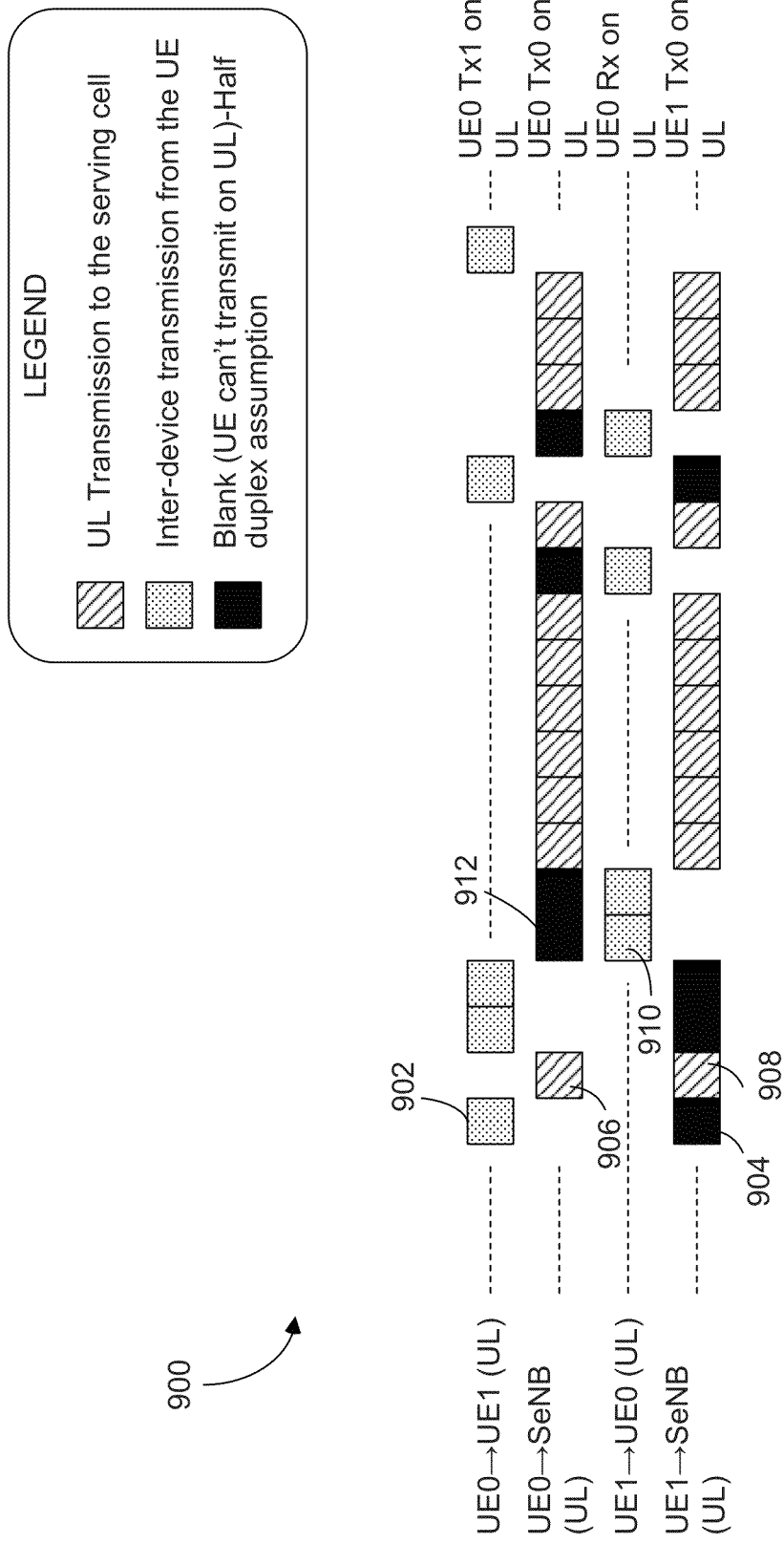
FIG. 9 illustrates yet another example resource allocation scheme for an inter-device communication link, in accordance with an example of the present disclosure.

FIG. 9 illustrates another example resource allocation scheme 900 for an inter-device communication link when UL radio resources are used for the inter-device communication link. In this example resource allocation scheme, the UE is not able to transmit to other UEs using UL resources and transmit to the serving eNB using UL resources simultaneously. As shown in FIG. 9, UE0 transmits to UE1 using UL resources at 902. While UE0 is transmitting to UE1, UE0 is not be able to transmit to the serving eNB simultaneously. This restriction may be for UEs that have only one transmit chain for D2D link and network-device link. Because UE1 is not able to transmit to the serving eNB while listening to the transmission from UE0 over the inter-device link on UL resources, 904 is shown as a blank subframe for UE1. UE0 and UE1 transmit to the serving eNB at 906 and 908, respectively, and they do not communicate with each other over the D2D link using UL resources when transmitting to the serving eNB. Similarly, while UE1 transmits to UE0 over the inter-device link using UL resources at 910, UE1 is not transmitting to the serving eNB simultaneously. While UE0 listens to transmissions from UE1 over the D2D link, UE0 is not able to transmit to the serving eNB at 912. The D2D radio resource allocation using the UL radio resource may include a guard time to account for the additional transmit-to-receive switching time between consecutive subframes at the UE end.

Figure 10:
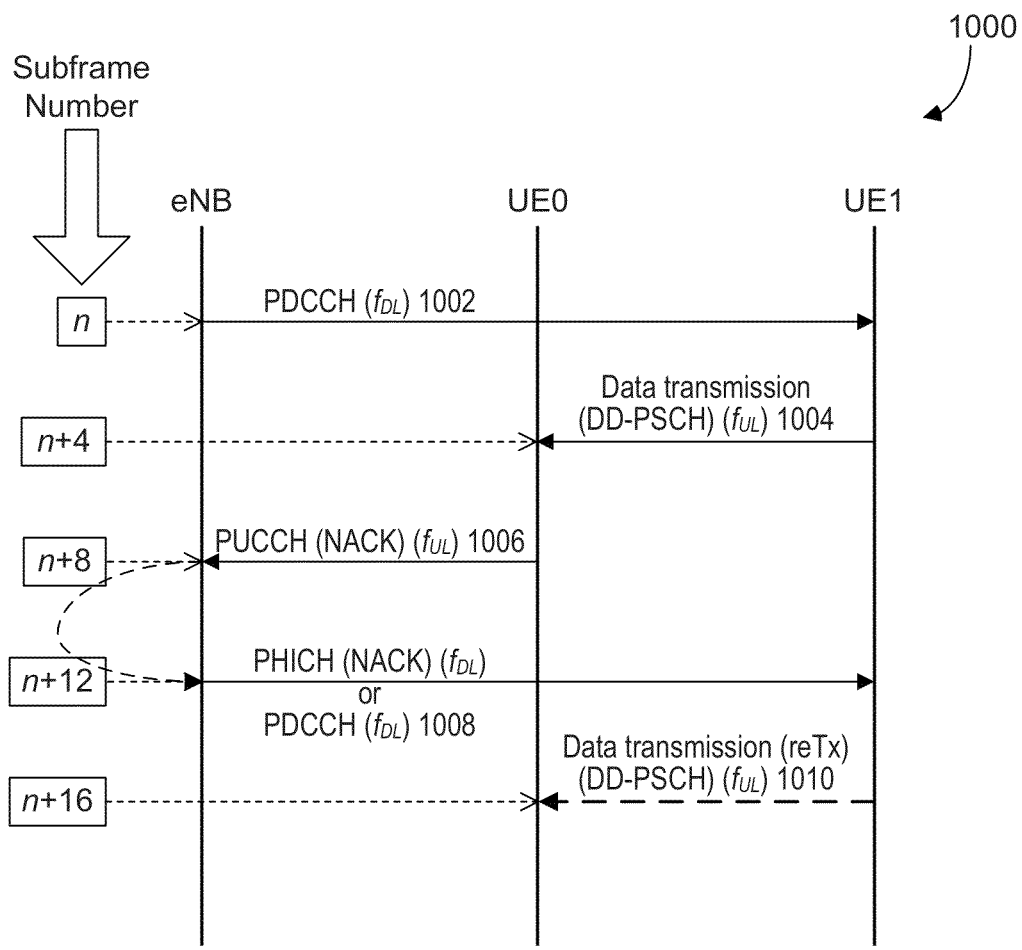
FIG. 10 illustrates a flow diagram of yet another example HARQ transmission scheme for an inter-device communication link, in accordance with an example of the present disclosure.

FIG. 10 illustrates a flow diagram 1000 of an example HARQ transmission scheme for an inter-device communication link when UL radio resources are used for the inter-device communication link, in accordance with an example of the present disclosure. In this example, the D2D link layer 1 control signals (e.g., ACK/NACK, CQI, rank indicator, etc.) are routed through the eNB.

As shown in FIG. 10, the eNB may send out the resource grant for D2D communication on PDCCH at 1002. The PDCCH for D2D communication may be scrambled by the DD-RNTI. Both of the D2D UEs, i.e., UE0 and UE1, monitor the PDCCH from eNB for the resource grant. This resource grant may indicate the transmit point ID (TPID) as part of the DCI format. The UE with the TPID will transmit the data packets and all the other UEs may listen to the transmission during those granted radio resources.

After receiving the PDCCH, the D2D transmitting UE, i.e., UE1, performs the D2D transmission using the allocated UL resources and MCS indicated in PDCCH at 1004. The D2D transmission may occur after a pre-determined time period from the time the resource grant is received. For example, the D2D transmission 1004 may occur at four subframes after the transmission of resource grant 1002. Similarly, the D2D receiving UE, i.e., UE0, may expect to decode the D2D data on the resources indicated in PDCCH 4 subframes later. The pre-determined time period may be greater than, or less than 4 subframes, though this period should be longer than the time required for the UE to decode the PDCCH.

Once the D2D receiving UE, i.e., UE0, decodes the D2D data, the D2D receiving UE will send a HARQ signal, e.g., ACK/NACK to the eNB via physical uplink control channel (PUCCH) at 1006. The ACK/NACK signal is transmitted to the eNB using UL frequency ($f_{UL}$). This ACK/NACK transmission may occur after a pre-determined time period after the D2D receiving UE decodes the D2D data. For example, the ACK/NACK transmission 1006 may occur four subframes after the D2D receiving UE decodes the D2D data. The pre-determined time period may be greater than, or less than 4 subframes, though this period should be longer than the time required for the UE to decode the D2D data.

After the eNB receives ACK/NACK, the serving eNB may send out a PDCCH for either a new transmission or a retransmission for the adaptive retransmissions. Alternatively or in addition, the serving eNB can send the ACK/NACK over PHICH for the non-adaptive retransmissions. Both the UEs taking part in D2D communication, i.e., UE0 and UE1, can listen to the eNB for the ACK/NACK. In this way, the UE transmitting the ACK/NACK can check whether the eNB received ACK/NACK correctly. After receiving the ACK/NACK signal or the PDCCH signal from the eNB at 1008, UE1 may retransmit the data packet to UE0 at 1010 using the allocated UL inter-device link resources, if a NACK is received or if a PDCCH retransmission message is received.

In some implementations, after the D2D transmitting UE transmits the D2D data, the UE may maintain the data in its HARQ buffer. When the UE receives the PDCCH for new transmission (e.g., NDI bit is set or toggled) for this HARQ process, the UE may flush the HARQ buffer and store the new data received from the RLC layer. When the UE receives the PDCCH for the retransmissions, the UE may retransmit the data in the HARQ buffer according to the MCS and the redundancy version (RV).

The D2D HARQ process can be implemented in a synchronous mode or an asynchronous mode. In the synchronous mode, HARQ process may be identified by the subframe number which may be similar to the LTE UL operation. For example, in the LTE UL operation, the HARQ process of a PHICH is linked to the UL data packet that is transmitted a number of subframes (e.g., 4 subframes) earlier. In this mode, no HARQ process number is needed in the PDCCH resource grant. In the asynchronous mode, the HARQ process number may be indicated in the PDCCH resource grant. The UE may operate the HARQ process according to the HARQ ID in the PDCCH resource grant. In doing so, no PHICH is needed for the D2D communication, which may improve the D2D communication reliability. The probability of successful reception of ACK/NACK at UE1 may be optimized based on the reception quality of PUCCH at the eNB and PHICH at the UE1, e.g., $p_e=1-(1-p_{PHICH})$, when the serving eNB sends the received ACK/NACK from UE0 to UE1 through PHICH. The probability of successful reception of ACK/NACK at UE1 may be optimized based on the reception quality of PUCCH at the eNB and PHICH at the UE1, e.g., $p_e=1-(1-p_{PUCCH})(1-p_{PDCCH})$ when the serving eNB sends PDCCH with NDI bit set according to the received ACK/NACK from UE0.

To distinguish the ACK/NACK signals from/to the serving eNB and to the other UEs, each D2D UE may be assigned two sets of PUCCH and PHICH resources. In some implementations, the same set of resources can be used if the resource scheduling is performed such that there is no conflict between the network-to-device and device-to-device communication channels.

Figure 11:
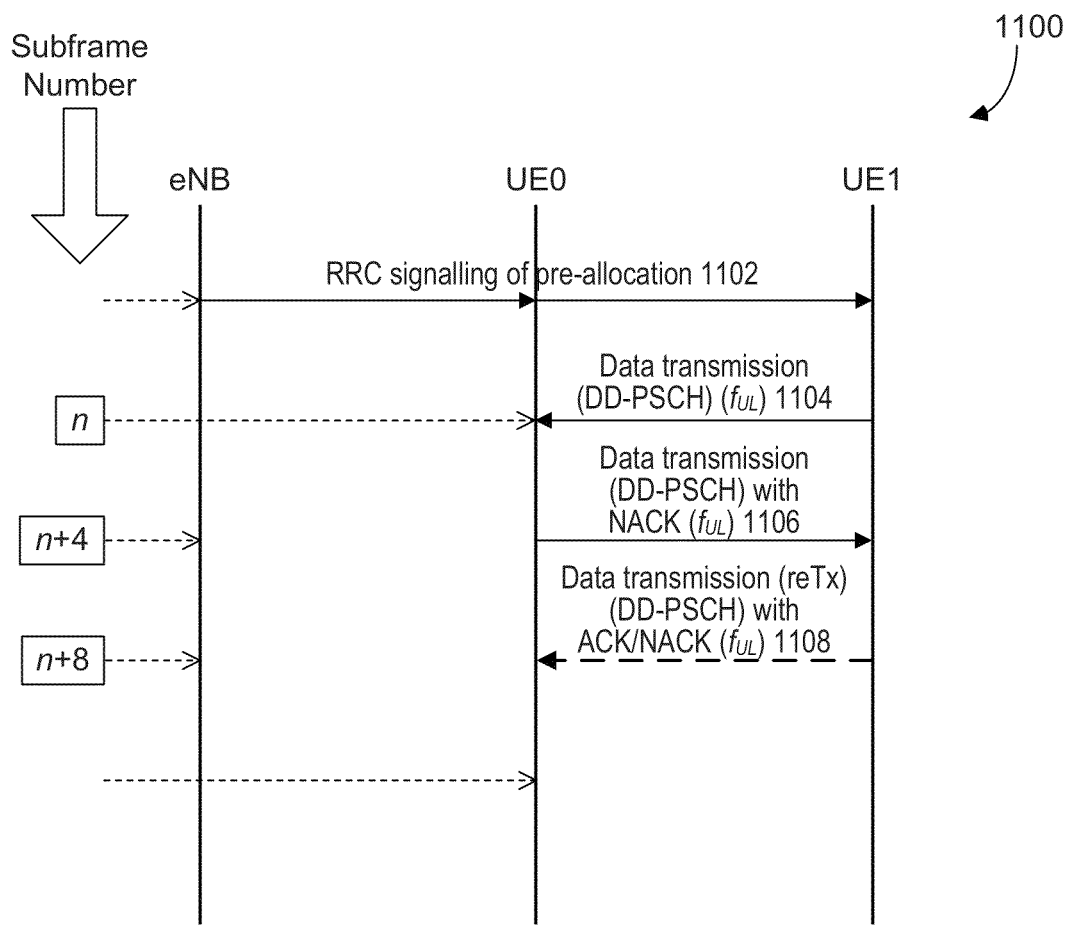
FIG. 11 illustrates a flow diagram of yet another example HARQ transmission scheme for an inter-device communication link, in accordance with an example of the present disclosure.

FIG. 11 illustrates a flow diagram 1100 of another example HARQ transmission scheme for an inter-device communication link when UL resources are used for the inter-device communication, in accordance with another example of the present disclosure. In this example, the D2D resources are pre-allocated by the eNB and the HARQ signals (e.g., ACK/NACK) are transmitted directly on the inter-device communication link without routing through the eNB.

The eNB may signal the two D2D UEs about the allocated UL resource for the D2D communication at 1102, including for example, the assigned UL resource blocks and the subframes, the MCS, the transmission mode, the transmit power, etc. The pre-allocation parameters may be signaled via RRC. Alternatively the pre-allocation may be signaled via a MAC control element.

During the D2D communication, the D2D receiving UE may try to decode the signal from the D2D transmitting UE at 1104 with the information provided in the pre-allocation. The D2D transmission over DD-PSCH may use PUSCH format and synchronous non-adaptive HARQ may be used. The D2D transmission over DD-PSCH may be scrambled by DD-RNTI.

The ACK/NACK signal for the received D2D transmission may be multiplexed with the data transmission at 1106. Similar to the control information and data being multiplexed on PUSCH in the current LTE, the ACK/NACK and data may be encoded separately, and the ACK/NACK encoded bits may be present on both slots and mapped to resource elements (REs) around DMRS. Since ACK/NACK and data may need different coding rates due to the different error protection level, an MCS offset value $\beta_{offset,DD}^{HARQ-ACK}$ can be applied to the ACK/NACK signal. This MCS offset value may be signaled to the UE via RRC. If there is no data to transmit, the ACK/NACK information may still be transmitted at the REs around DMRS. Alternatively or in addition, the ACK/NACK signal may be sent on PUCCH. Assuming the D2D UE pair is not in the proximity to the eNB, due to the low transmit powers of D2D UEs, the PUCCH may be spatially reused among the macro cell and the D2D pair without generating much interference to each other. The UE may trigger a packet retransmission at 1108 if NACK signal is received. In another alternative, the D2D receiving UE, i.e. UE0, may send the ACK/NACK via a PUCCH directly to the transmitting UE, i.e. UE1. In this case UE1 will monitor the PUCCH from UE0 for ACK/NACK. The transmit power for this PUCCH transmission will be much lower than the regular PUCCH transmission to a eNB. These PUCCH resources may be pre-assigned (either explicitly or implicitly) by the serving eNB. For example, the PUCCH resources may be linked to the uplink resources for the transmission of the data packet over the inter-device communication link. PUCCH may be used for receiving the ACK/NACK as well as other feedback metrics such as CQI, rank indicator (RI), etc., directly from the other device.

In this HARQ transmission scheme, the UEs solely depend on ACK/NACK to determine a new transmission or retransmission. In case of ACK-to-NACK or NACK-to-ACK error, the two D2D UEs may be out of sync on the HARQ states, which may significantly reduce the data throughput due to error propagation. To address this issue, the D2D data transmission may carry a new data indicator (NDI), which may be a one-bit indicator, to indicate whether the transmission is for a new transmission or retransmission. The NDI bit could be multiplexed with the data in a similar way as the control information and data being multiplexed on PUSCH. To reduce the decoding error rate of NDI, the NDI and data may be encoded separately, and the NDI encoded bits may be present on both slots and mapped to REs around DMRS. Since NDI may need a lower coding rate than data, an MCS offset value $\beta_{offset,DD}^{NDI}$ may be applied to NDI. This MCS offset value or alternatively the MCS scheme for NDI may be signaled to the UE via RRC. Alternatively, a fixed MCS offset value or a fixed MCS level for NDI may be specified in the LTE or LTE-Advanced standards. In addition to the NDI and ACK/NACK signal, other control information may also be multiplexed with PUSCH.

During the D2D communication, the D2D UEs may periodically update the eNB about the D2D link quality such that the eNB can adjust the resource allocation for the D2D link. The UE may send the D2D link quality update on PUCCH to the eNB and simultaneously communicate with the other D2D UE. However, if the UE is not able to handle the D2D PUSCH transmission and the PUCCH transmission to the eNB simultaneously, then the D2D UE may be configured to tune away from D2D link communication periodically to communicate with the eNB.

During the D2D communication, the D2D UE may not need to monitor the eNB for most of the time. However, the D2D UE may need to listen to the eNB for potential resource allocation modification or listen to the eNB for potential incoming calls from the eNB. This is feasible for the D2D UEs since the D2D communication is on the UL frequency while the UE listens to the eNB on the DL frequency.

To assist the eNB in determining when to start or stop the resource allocation for D2D communication, the D2D UE may send a BSR or SR to the eNB. In some implementations, if the D2D link has been idle for a certain time period, the UE may signal the eNB to withdraw the pre-allocated resource.

In some implementations, if the UE is capable of performing simultaneous PUCCH and PUSCH transmissions to other D2D UEs, the PUCCH may be used to transmit additional control information for D2D link. For example, PUCCH may be used to transmit the MCS and RB location information of D2D transmission. The D2D receiving UE may first decode PUCCH and use the obtained information to further decode D2D PUSCH. Due to the low transmit power of D2D link, the spatial reuse of PUCCH on D2D link may not generate much interference to the macro PUCCH.

In inter-device communications, the UEs are usually in close proximity and the radio link the D2D link may often include a line-of-sight component. Accordingly, the radio link parameters may be set to exploit the characteristics of the D2D link.

Figure 12:
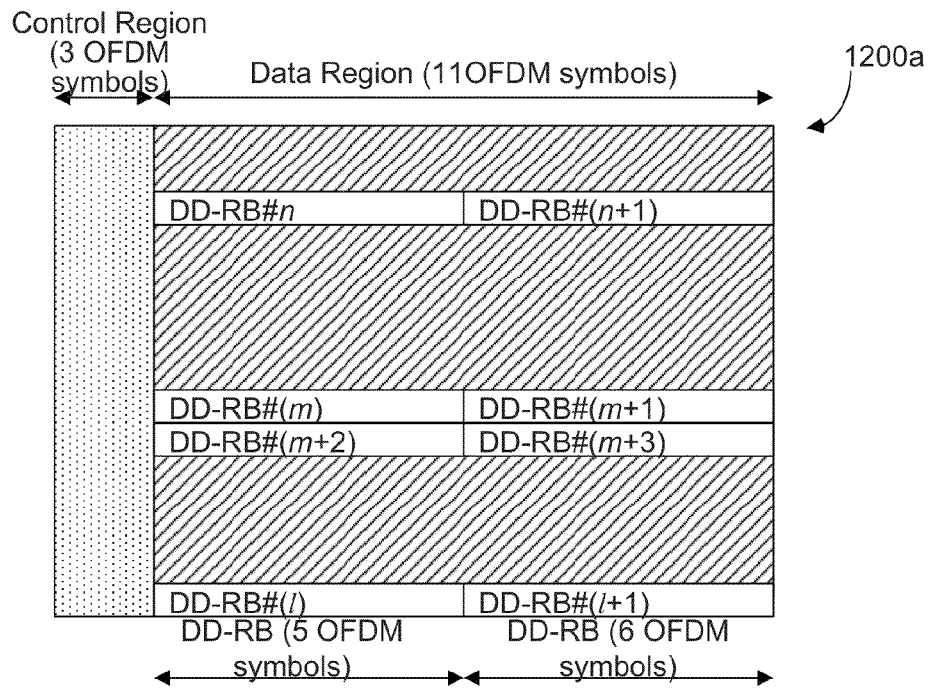
FIG. 12(*a*) illustrates an example resource assignment for an inter-device communication link, in accordance with an example of the present disclosure.
Figure 12:
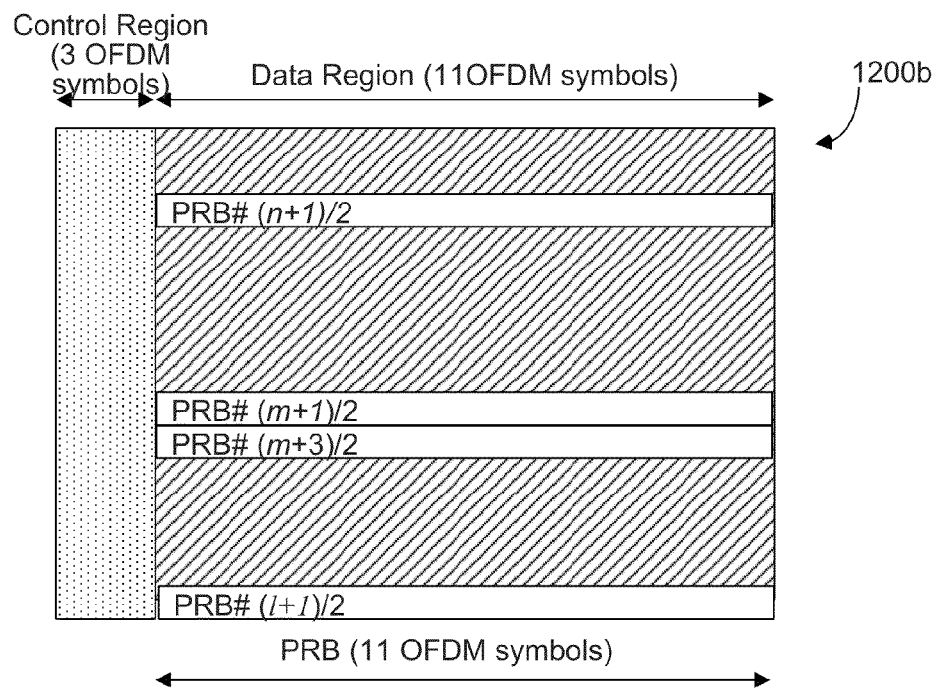

FIG. 12 (a) illustrates an example resource assignment 1200a for an inter-device communication link using downlink resources, in accordance with an aspect of the present disclosure. FIG. 12 (b) illustrates another example resource assignment 1200b for an inter-device communication link using downlink resources, in accordance with an aspect of the present disclosure. Specifically, FIG. 12 (a) shows an example resource assignment based on device-to-device resource blocks (DD-RBs) for the inter-device communications on the inter-device communication link. In contrast, FIG. 12(b) shows an example resource assignment based on physical resource blocks (PRBs) for communications on the inter-device communication link. The PRB-based resource assignment is also used for the eNB-to-UE link. A similar resource allocation technique based on the DD-RBs or PRBs can be used for the case where the UL resources are used for direct inter-device communication link, except that the size and location of the control region and data region may differ for UL and DL.

Since the information data rates over the inter-device communication link tend to be higher, the resource allocation size can be reduced to sub-RB level, e.g., the physical resource block (PRB) may be divided into multiple resource blocks, which can be referred to as device-to-device resource blocks (DD-RBs). The PRB is a basic resource allocation unit in LTE and LTE-Advanced. A base station may transmit a first resource grant to a user equipment (UE), the first resource grant including a resource allocation in DD-RBs for a transmission from the UE to one other UE over an inter-device communication link, and transmit a second resource grant to the UE for a transmission to the base station, the second resource grant including a resource allocation in PRBs. On the other hand, a UE may receive a resource grant from a base station for a transmission to another UE over an inter-device communication link, the resource grant including a resource allocation in DD-RBs, and transmit to the other UE over the inter-device communication link using the allocated DD-RBs.

As shown in FIG. 12 (a), the DD-RB may occupy multiple OFDM symbols within a subframe. Each physical resource block (PRB) may include two or more device-to-device resource blocks (DD-RBs). The DD-RBs included in each PRB may be of the same size or different sizes. For example, in FIG. 12 (a), the control region of the subframe contains 3 OFDM symbols and the data region of the subframe contains 11 OFDM symbols. One DD-RB may occupy 5 OFDM symbols and another DD-RB may occupy 6 OFDM symbols within the data region as shown in FIG. 12 (a). In contrast, each PRB spans the whole data region, containing 11 OFDM symbols, as shown in FIG. 12 (b). Note that the number of OFDM symbols included in the control region and data region may differ from this example. Also the DD-RBs may occupy different numbers of OFDM symbols without departing from the scope of the present disclosure.

The DD-RBs may be numbered similarly to PRBs. As shown in FIGS. 12 (a) and (b), there are a total number of (l+1)/2 PRBs, whereas there are a total number of (l+1) DD-RBs, within the same data region. The number of DD-RBs in a subframe is double the number of PRBs. The PRBs are divided in time domain into two DD-RBs with the same frequency resource.

The resource allocation types as defined in LTE systems can be reused for resource allocations to a D2D link in units of DD-RBs. Since the number of DD-RBs is more than the number of PRBs, more signaling bits in the DCI format may be required. In some implementations, this requirement may be relaxed by defining a DD-RB region in system information broadcast (SIB) messages to indicate the region of the DD-RBs. In one alternative, a flag bit to indicate whether the resource allocation is for PRBs or DD-RBS may be required in the DCI formats.

Although not shown in FIG. 12, the PRBs may also be divided in frequency domain into two or more DD-RBs. For example, instead of having 12 subcarriers in a PRB, one DD-RB may include 6 subcarriers. Thus, each PRB consists of 2 DD-RBs. It should be understood that each PRB may also be divided into more than 2 DD-RBs by reducing the number of OFDM symbols or the number of subcarriers in the DD-RB.

Because of the good radio link quality of the inter-device link, higher order modulations such as 256 quadrature amplitude modulation (QAM), may be used for the inter-device link. The spatial diversity schemes, such as, spatial multiplexing (SM) and space frequency block coding (SFBC) tend to be less useful for the inter-device communication link, and thus the number of transmit antennas used for direct communication between the UEs may be as few as one. The number of transmit antennas can be increased to two or more when polarization diversity is used. In some implementations, the DCI format may be modified to indicate the higher modulation schemes for the inter-device communication link resource grants.

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Method steps may be implemented in an order that differs from that presented herein.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. Although certain illustrated examples in this disclosure may show only two UEs, the described systems and methods for the inter-device communications can be applied to more than two UEs without departing from the scope of the present disclosure.

What is claimed is:

1. A method at a user equipment (UE) for wireless communication, comprising:
   transmitting a channel quality indicator (CQI) and a buffer status report (BSR) of an inter-device communication link to a base station, wherein the inter-device communication link is a direct link between the UE and another UE;
   receiving, via a first frequency resource, a data packet from the other UE over the inter-device communication link; and
   transmitting, via a second frequency resource, a hybrid automatic repeat request (HARQ) signal to the base station, the HARQ signal indicating whether the data packet received over the inter-device communication link has been successfully decoded, wherein the second frequency resource has a predetermined relation with the first frequency resource.

2. The method of claim 1, further comprising:
   receiving a retransmission of the data packet from the other UE over the inter-device communication link.

3. The method of claim 1, wherein the HARQ signal is an acknowledgement (ACK) or a non-acknowledgement (NACK) signal.

4. The method of claim 1, wherein the HARQ signal is transmitted using a physical uplink control channel (PUCCH).

5. The method of claim 1, further comprising:
   performing a device handshake procedure with the other UE prior to receiving the data packet over the inter-device communication link.

6. The method of claim 1, wherein the data packet is received over the inter-device communication link using long term evolution (LTE) downlink radio resources.

7. The method of claim 6, wherein the data packet is received on a physical downlink shared channel (PDSCH).

8. The method of claim 7, wherein a guard time is used on the PDSCH for a transmission of the data packet.

9. The method of claim 1, wherein the data packet is received over the inter-device communication link using long term evolution (LTE) uplink radio resources.

10. The method of claim 1, further comprising:
    transmitting a scheduling request (SR) of the inter-device communication link to the base station.

11. A method at a user equipment (UE) for wireless communication, comprising:
    transmitting a channel quality indicator (CQI) and a buffer status report (BSR) of an inter-device communication link to a base station, wherein the inter-device communication link is a direct link between the UE and another UE;
    transmitting, via a first frequency resource, a data packet to the other UE over inter-device communication link; and
    receiving, via a second frequency resource, a hybrid automatic repeat request (HARQ) signal from the base station, the HARQ signal indicating whether the data packet transmitted over the inter-device communication link has been successfully decoded at the other UE, wherein the second frequency resource has a predetermined relation with the first frequency resource.

12. The method of claim 11, further comprising:
    retransmitting the data packet to the other UE over the inter-device communication link, responsive to receiving the HARQ signal from the base station.

13. The method of claim 11, wherein the HARQ signal is an acknowledgement (ACK) or a non-acknowledgement (NACK) signal.

14. The method of claim 11, wherein the HARQ signal is received on a physical HARQ indicator channel (PHICH).

15. The method of claim 11, wherein the HARQ signal is received after a predetermined time period after the data packet is transmitted from the UE.

16. The method of claim 11, further comprising:
    receiving a resource grant from the base station prior to transmitting the data packet over the inter-device communication link, wherein the resource grant includes resources for transmitting the data packet over the inter-device communication link.

17. The method of claim 11, wherein the data packet is transmitted over the inter-device communication link using long term evolution (LTE) downlink radio resources.

18. The method of claim 17, wherein the data packet is transmitted on a physical downlink shared channel (PDSCH).

19. The method of claim 18, wherein a guard time is used on the PDSCH for transmitting the data packet.

20. The method of claim 11, wherein the data packet is transmitted over the inter-device communication link using long term evolution (LTE) uplink radio resources.

21. A user equipment (UE) configured to:
    transmit a channel quality indicator (CQI) and a buffer status report (BSR) of an inter-device communication link to a base station, wherein the inter-device communication link is a direct link between the UE and another UE;
    receive, via a first frequency resource, a data packet from the other UE over the inter-device communication link; and
    transmit, via a second frequency resource, a hybrid automatic repeat request (HARQ) signal to the base station, the HARQ signal indicating whether the data packet received over the inter-device communication link has been successfully decoded, wherein the second frequency resource has a predetermined relation with the first frequency resource.

22. The user equipment of claim 21, further configured to:
    receive a retransmission of the data packet from the other UE over the inter-device communication link.

23. The user equipment of claim 21, further configured to:
    perform a device handshake procedure with the other UE prior to receiving the data packet over the inter-device communication link.

24. The user equipment of claim 21, further configured to:
    transmit a scheduling request (SR) of the inter-device communication link to the base station.

25. A user equipment (UE) configured to:
transmit a channel quality indicator (CQI) and a buffer status report (BSR) of an inter-device communication link to a base station, wherein the inter-device communication link is a direct link between the UE and another UE;
transmit, via a first frequency resource, a data packet to the other UE over the inter-device communication link; and
receive, via a second frequency resource, a hybrid automatic repeat request (HARQ) signal from the base station, the HARQ signal indicating whether the data packet transmitted over the inter-device communication link has been successfully decoded at the other UE, wherein the second frequency resource has a predetermined relation with the first frequency resource.

26. The user equipment of claim 25, further configured to:
retransmit the data packet to the other UE over the inter-device communication link, responsive to receiving the HARQ signal from the base station.

27. The user equipment of claim 25, further configured to:
receive a resource grant from the base station prior to transmitting the data packet over the inter-device communication link, wherein the resource grant includes resources for transmitting the data packet over the inter-device communication link.

28. The method of claim 1, wherein the BSR is used to assist in a determination of when to allocate resources for the inter-device communication link.

29. The method of claim 11, wherein the BSR is used to assist in a determination of when to allocate resources for the inter-device communication link.

30. The user equipment of claim 21, wherein the BSR is used to assist in a determination of when to allocate resources for the inter-device communication link.

31. The user equipment of claim 25, wherein the BSR is used to assist in a determination of when to allocate resources for the inter-device communication link.

* * * * *